US010556803B2

(12) United States Patent
Wilcox et al.

(10) Patent No.: US 10,556,803 B2
(45) Date of Patent: Feb. 11, 2020

(54) AMMONIA SYNTHESIS USING A CATALYTIC NITROGEN-SELECTIVE MEMBRANE

(71) Applicant: Colorado School of Mines, Golden, CO (US)

(72) Inventors: Jennifer Wilcox, Golden, CO (US); Simona Liguori, Lakewood, CO (US)

(73) Assignee: Colorado School of Mines, Golden, CO (US)

( * ) Notice: Subject to any disclaimer, the term of this patent is extended or adjusted under 35 U.S.C. 154(b) by 167 days.

(21) Appl. No.: 15/707,007

(22) Filed: Sep. 18, 2017

(65) Prior Publication Data

US 2018/0079653 A1 Mar. 22, 2018

Related U.S. Application Data

(60) Provisional application No. 62/395,713, filed on Sep. 16, 2016.

(51) Int. Cl.
| | | |
|---|---|---|
| *C01C 1/04* | (2006.01) | |
| *B01D 53/22* | (2006.01) | |
| *B01D 71/02* | (2006.01) | |
| *B01J 19/24* | (2006.01) | |
| *B01D 69/02* | (2006.01) | |
| *B01J 35/06* | (2006.01) | |

(52) U.S. Cl.
CPC .......... *C01C 1/0411* (2013.01); *B01D 53/228* (2013.01); *B01D 69/02* (2013.01); *B01D 71/022* (2013.01); *B01J 19/2475* (2013.01); *B01J 35/065* (2013.01); *B01D 2311/2696* (2013.01); *B01D 2325/10* (2013.01)

(58) Field of Classification Search
CPC ..... C01C 1/0411; C01C 1/28; B01D 67/0072; B01D 71/022; B01D 53/228; B01D 69/02; B01D 2256/10; B01D 2258/0283; B01D 2257/504; B01D 71/025; B01D 69/10; B01D 2325/10; B01D 2311/2696; B01J 19/2475; B01J 35/065; Y02P 20/52; Y02P 20/152; Y02C 10/10
See application file for complete search history.

(56) References Cited

U.S. PATENT DOCUMENTS

| | | | | |
|---|---|---|---|---|
| 4,781,907 A | * | 11/1988 | McNeill | B01D 53/22 252/372 |
| 5,456,740 A | * | 10/1995 | Snow | B01D 39/2034 96/11 |
| 2011/0182797 A1 | * | 7/2011 | Wilcox | B01D 53/228 423/359 |

OTHER PUBLICATIONS

Aboud et al., "A Density Functional Theory Study of the Charge State of Hydrogen in Metal Hydrides," Journal of Physical Chemistry, vol. 114, No. 24, 2010, pp. 10978-10985.

(Continued)

*Primary Examiner* — Anthony J Zimmer
(74) *Attorney, Agent, or Firm* — Sheridan Ross PC

(57) ABSTRACT

The invention relates to a metallic membrane for nitrogen separation, the method of making the membrane and methods of using the membrane. The invention also relates to a metallic membrane for disassociation of nitrogen and subsequent reaction with hydrogen to produce ammonia at moderate conditions compared to a conventional Haber-Bosch process.

17 Claims, 9 Drawing Sheets

(56) References Cited

OTHER PUBLICATIONS

Akika et al., "Preparation and Characterization of Chlorine-Free Ruthenium Catalysts and the Promoter Effect in Ammonia Synthesis: 3. A Magnesia-Supported Ruthenium Catalyst," Journal of Catalysis, vol. 136, No. 1, 1992, pp. 126-140.
Allam, "Improved oxygen production technologies," Energy Procedia vol. 1, No. 1, 2009, pp. 461-470.
Amrollahi et al., "Thermodynamic analysis on post-combustion CO2 capture of natural-gas-fired power plant," International Journal of Greenhouse Gas Control vol. 5, No. 3, 2011, pp. 422-426.
Boratto et al., "Oxygen and Nitrogen Diffusion in Vanadium," Scripta Metallurgica, vol. 11, No. 12, 1977, pp. 1107-1111.
Bozso et al,, "Interaction of Nitrogen with Iron Surfaces I: Fe(100) and Fe(111)," Journal of Catalysis vol. 49, No. 1, 1977, pp. 18-41.
Bozso et al., "Interaction of Nitrogen with Iron Surfaces II: Fe(110)," Journal of Catalysis vol. 50, No. 3, 1977, pp. 519-529.
Chandrasekharaiah, "The Nb—Pd (Niobium-Palladium) System," Bulletin of Alloy Phase Diagrams, vol. 9, No. 4, 1988, pp. 449-452.
Dahl et al. "Electronic Factors in Catalysis: the Volcano Curve and the Effect of Promotion in Catalytic Ammonia Synthesis," Applied Catalysis vol. 222, 2001, pp. 19-29.
Ertl et al., "XPS Studies with Ammonia Synthesis Catalysts," Applications of Surface Science, vol. 3, 1979, pp. 99-112.
Falicov et al., "Correlation between catalytic activity and bonding and coordination number of atoms and molecules on transition metal surfaces: Theory and experimental evidence," Proceedings of the National Academy of Sciences of the United States of America, vol. 82, No. 8, 1985, pp. 2207-2211.
Frayne, "Boiler Water Treatment: Principles and Practice," 2002, Chemical Publishing Co. Inc., New York, NY, 995 pages.
Henkelman et al., "A climbing image nudged elastic band method for finding saddle points and minimum energy paths," Journal of Chemical Physics, vol. 113, No. 22, 2000, pp. 9901-9904.
Henkelman et al., "A fast and robust algorithm for Bader decomposition of charge density," Computational Materials Science, vol. 36, 2006, pp. 354-360.
Henry et al., "Solubility of Nitrogen in Alpha Vanadium from 600° to 1200° C.," Journal of the Less Common Metals, vol. 25, No. 1, 1971, pp. 39-47.
Henry et al,, "The Vanadium-Oxygen System: Phase Relations in the Vanadium-Rich Region Below 1200° C.," Journal of the Less Common Metals, vol. 21, No. 2, 1970, pp. 115-135.
Holleck, "Diffusion and Solubility of Hydrogen in Palladium and Palladium-Silver Alloys," Journal of Physical Chemistry, vol. 74, No. 3, 1970, pp. 503-511.
Honkala et al., "Ammonia synthesis frond first-principle calculations," Science, vol. 307, No. 5709, 2005, pp. 555-558.
Jacobsen, "Boron Nitride: A Novel Support for Ruthenium-Based Ammonia Synthesis Catalysts," Journal of Catalysis, vol. 200, No. 1, 2011, pp. 1-3.
Jacobsen, "Structure sensitivity of supported ruthenium catalysts for ammonia synthesis," Journal of Molecular Catalysis A: Chemical, vol. 163, 2000, pp. 19-26.
Jonsson et al., "Chapter 16: Nudged elastic band method for finding minimum energy paths of transitions," in Classical and Quantum Dynamics in Condensed Phase Simulations, 1998, World Scientific, Singapore, pp. 385-404.
Kresse et al., "Ab initio molecular dynamics for open-shell transition metals," Physical Review B., vol. 48, No. 17, 1993, pp. 13115-13118.
Kresse et al., "Efficiency of ab-initio total energy calculations for metals and semiconductors using a plane-wave basis set," Computational Materials Science vol. 6, No. 1, 1996, pp. 15-50.
Monkhorst et al., "Special points for Brillonin-zone integrations," Physical Review B, vol. 13, No. 12, 1976, pp. 5188-5192.
Mortensen et al., "Nitrogen Adsorption and Dissociation on Fe(111)," Journal of Catalysis, vol. 182, No. 2, 1999, pp. 479-488.
Mortensen et al., "Nitrogen adsorption on Fe(111), (100), and (110) surfaces," Surface Science, vol. 422, 1999, pp. 8-16.
Murata et al., "Preparation and Characterization of Chlorine-Free Ruthenium Catalysts and the Promoter Effect in Ammonia Synthesis: 2. A Lanthanide Oxide-Promoted Ru/Al2O3 Catalyst," Journal of Catalysis, vol. 136, No. 1, 1992, pp. 110-117.
Nørskov et al., "The nature of the active site in heterogeneous metal catalysis," Chemical Society Reviews, vol. 37, 2008, pp. 2163-2171.
Perdew et al., "Generalized Gradient Approximation Made Simple," Physical Review Letters, vol. 77, No. 18, 1996, pp. 3865-3868.
Powers, "Internal Friction in Oxygen-Vanadium and Nitrogen-Vanadium Solid Solutions," Acta Metallurgica, vol. 2, No. 4, 1954, pp. 604-607.
Ruban et al., "Surface electronic structure and reactivity of transition and noble metals," Journal of Molecular Catalysis A: Chemical, vol. 115, No. 3, 1997, pp. 421-429.
Sanville et al., "Improved Grid-Based Algorithm for Bader Charge Allocation," Journal of Computational Chemistry, vol. 28, 2007, pp. 899-908.
Schmidt et al., "Electrotransport of Carbon, Nitrogen and Oxygen in Vanadium," Journal of the Less-Common Metals, vol. 13, No. 5, 1967, pp. 493-500.
Sonwane et al., "Achieving optimum hydrogen permeability in PdAg and PdAu alloys," Journal of Chemical Physics, vol. 125, No. 18, 2006, 11 pages.
Sonwane et al., "Solubility of Hydrogen in PdAg and PdAu Binary Alloys Using Density Functional Theory," Journal of Physical Chemistry B, vol. 110, No. 48, 2006, 24549-24558.
Spencer et al., "Iron Single Crystals as Ammonia Synthesis Catalysts: Effect of Surface Structure on Catalyst Activity," Journal of Catalysis, vol. 74, No. 1, 1982, pp. 129-135.
Steward, "Review of Hydrogen Isotope Permeability Through Materials," Lawrence Livermore National Laboratory, 1983, 28 pages.
Strongin et al., "The Importance of C7 Sites and Surface Roughness in the Ammonia Synthesis Reaction over Iron," Journal of Catalysis, vol. 103, No. 1, 1982, pp. 129-135.
Stumpf et al., "Retardation of O diffusion through polycrystalline Pt by Be doping," Physical Review B, vol. 59, No. 24, 1999, pp. 16047-19052.
Tang et al., "A grid-based Bader analysis algorithm without lattice bias," Journal of Physics: Condensed Matter, vol. 21, No. 8, 2009, 8 pages.
Uberuaga et al., "Diffusion of Ge below the Si(100) Surface: Theory and Experiment," Physical Review Letters, vol. 84, No. 11, 2000, pp. 2441-2444.
Voter et al., "'Transition state theory description of surface self-diffusion: Comparison with classical trajectory results," Journal of Chemical Physics, vol. 80, No. 11, 1984, pp. 5832-5838.
Wasz et al., "Technical Note: The Diffusion of Nitrogen in Vanadium," Journal of Physics and Chemistry of Solids, vol. 53, No. 4, 1992, pp. 629-630.
Wilcox et al., "Heterogeneous Mercury Reaction Chemistry on Activated Carbon," Journal of the Air & Waste Management Association, vol. 61, No. 4, 2011, pp. 418-426.
Wilcox, "Carbon Capture," 2012, Springer, New York, NY, ISBN 978-1-4614-2214-3, 336 pages.

* cited by examiner

AMMONIA SYNTHESIS USING A CATALYTIC NITROGEN-SELECTIVE MEMBRANE

CROSS REFERENCE TO RELATED APPLICATIONS

This application claims priority and benefits under 35 U.S.C. § 119(e) to U.S. Provisional Patent Application Ser. No. 62/395,713 filed on Sep. 16, 2016, which is incorporated herein in its entirety by reference.

GOVERNMENT LICENSE RIGHTS

This invention was made with government support under grant number 1263991 awarded by the National Science Foundation (NSF), and grant number FA9550-16-1-0357 awarded by the Army Research Office. The government has certain rights in the invention.

FIELD OF INVENTION

The invention relates to a metallic membrane for nitrogen separation, the method of making the membrane and methods of using the membrane. In some embodiments, the invention relates to a metallic membrane for dissociation of nitrogen and subsequent reaction with hydrogen to produce ammonia at moderate conditions compared to a conventional Haber-Bosch process.

BACKGROUND

In the early twentieth century, Fritz Haber discovered that was possible to produce ammonia with the use of catalysts such as iron, ruthenium, and osmium, and by fixing nitrogen from air at high pressure and moderate temperatures. The current world population is just above 7 billion, of which 3-3.5 billion would not exist without this process of ammonia synthesis, commonly referred to as the Haber-Bosch process. This process consumes approximately 2.5% of the world's energy needs.

The abatement of $CO_2$ from point sources such as coal-fired power plants through the design of cost-effective membrane materials would decrease $CO_2$ emitted into the atmosphere. Climate change will impact agriculture and food production around the world because of elevated $CO_2$ in the atmosphere, higher temperatures, altered precipitation and transpiration regimes, and increased frequency of extreme events. With atmospheric $CO_2$ concentrations increasing from 280 to 391 ppm since the start of the Industrial Revolution, it is imperative that new technologies are advanced to avoid prolonging business-as-usual activity.

When fuel oxidation was first carried out for energy generation, there was no intention of capturing the $CO_2$ generated from the process. Air, the primary source of fuel oxidation, is approximately 78% $N_2$ and 21% $O_2$ by volume on a dry basis, excluding moisture content. $N_2$ is predominantly an inert gas throughout the combustion process, thereby diluting the $CO_2$ generated in the flue gas stream and increasing the work required for $CO_2$ separation. Advanced coal conversion processes—such as coal gasification, oxy-combustion, and chemical looping combustion—are under development to reduce the work required for separation by creating $CO_2$-concentrated gas outlet streams. However, current state-of-the-art technology for air separation at the scale required for these advanced conversion processes is cryogenic distillation, which is very energy-intensive. The $O_2$ requirements for these applications range between 3.0 to 20 tons/day/MW, which represents a significant potential market for $O_2$ within a $CO_2$ capture context.

SUMMARY

The present invention can be used to abate carbon dioxide ($CO_2$) from point sources, such as coal-fired power plants. The invention uses cost-effective membrane materials to remove $CO_2$ from point sources more cost-effectively than prior solutions. Global communities will benefit from the efficient and effective $CO_2$ capture performed by embodiments of the present invention, leading to mitigate global warming and climate change. Additionally, the new pathway of ammonia synthesis suggested herein can provide an opportunity to enhance the fertilizer production, helping to obtain a greater yield of crop production.

It is one aspect of the invention to use a metallic membrane to separate nitrogen from other gases (e.g., $CO_2$), which also separates $N_2$ into its atomic form (N), and subsequently reacts the atomic nitrogen with hydrogen to produce ammonia. This process is performed at moderate conditions compared to a conventional Haber-Bosch process.

The metals of interest for the metallic membrane include alloys of the group V metals, including vanadium, niobium, and tantalum. The metallic membrane catalytically dissociates nitrogen ($N_2$) into its atomic form, which "hops" through the interstitial sites of the metal lattice. On the permeate side of the membrane, hydrogen ($H_2$) is passed over and subsequently reacts with the highly reactive nitrogen atoms, thus forming intermediates (NH and $NH_2$) toward the formation of ammonia. The ammonia or intermediates desorb from the permeate side of the membrane.

In one embodiment, the metallic membrane separates $N_2$ from a gas mixture based upon a solution-diffusion mechanism. Nitrogen first adsorbs and catalytically dissociates on the surface, followed by atomic nitrogen hopping through the interstitial crystal sites of the bulk metal, ultimately leading to atomic nitrogen on the permeate (or sweep) side of the membrane. The flux of $N_2$ across the membrane is dependent upon a partial pressure driving force, which can be created by using $H_2$ as a sweep gas. The use of $H_2$ as a sweep gas can allow for the synthesis of ammonia.

Although there are several applications that would benefit from a $N_2$-selective catalytic membrane, one main application is using it on flue gas for indirect $CO_2$ capture, which is of great importance for minimizing climate change due to increased $CO_2$ emissions from coal- and natural gas-fired power plants. The nitrogen-selective membranes can also be applicable for air separation processes.

Additional benefits can be attained if chemically-resistant nitrogen-selective membranes are applied to post-combustion $CO_2$ separation, for example before the selective catalytic reducer. The separation of $N_2$ in the flue gas can reduce the total volume of the flue gas, thus lowering the energy use for gas handling in the subsequent pollutant removal processes.

Membrane separation has several advantages over traditional separation processes for $CO_2$ capture such as absorption and adsorption, including no regeneration, ease of integration into a power plant, process continuity, space efficiency, and absence of a phase change, which can lead to an increase in efficiency of the overall process. Membrane applications, however, require a sufficient driving force for effective separation of a more permeable species. This is a challenge for post-combustion capture of $CO_2$ from traditional coal- or natural gas-fired power plants because of the low concentration of $CO_2$ in the flue gases of these processes. For membrane technology to be applicable for these somewhat $CO_2$-dilute systems, either the $CO_2$ concentration would have to be increased, or the selective component would have to be the dominant species (i.e., $N_2$) in the gas mixture. The realization of a $N_2$-selective membrane would allow for $CO_2$ to be separated from $N_2$ on the high-pressure side of the membrane (i.e., retentate stream), which would lead to a reduction in compression energy required for pipeline transport of $CO_2$. Typical pipeline transport conditions are approximately 110 bar and 35° C. Similarly, for the application of natural gas purification, $N_2$-free natural gas would be produced on the high-pressure side of the membrane, thereby reducing the costs of recompression for pipeline transport. Recompression is often required today, because standard methods for separating $N_2$ from natural gas use polymer membrane technologies that are selective to natural gas on the low-pressure (permeate stream) side of the membrane.

The work spent to separate $N_2$ from a gas mixture using a catalytic membrane conveniently places nitrogen in atomic form on the permeate side of the membrane, making it very reactive. The rate-determining step in ammonia synthesis is the dissociation of $N_2$. Traditionally, Group V metals, such as vanadium (V) and niobium (Nb), are not used as catalysts in their pure form because they bind too strongly, leading to low turnover frequencies. It can be advantageous for the metal to strongly bind since this binding strength directly relates to the metal's solubility for the adsorbate ($N_2$ in this case). However, the membrane should be capable of releasing bulk-phase nitrogen.

The use of a catalytic membrane to change the architecture of a traditional catalytic reactor allows for the use of strong-binding transition metals on the far left of the periodic table, such as V, Nb or tantalum (Ta). These transition metals would not be used in a traditional catalytic reactor in their pure form, as they would bind nitrogen, hydrogen, and ammonia too strongly leading to low turnover frequency. However, using these metals and their alloys as micron-thick membranes in the advanced configuration of a catalytic membrane reactor allows for the catalytic dissociation of nitrogen to take place at lower pressure, with reduced overall energy costs. An aspect of the present invention is related to a method to synthesize membranes that selectively separate nitrogen ($N_2$) from gas mixtures, the membranes themselves, and methods of using the membranes. The membranes will have numerous applications at the industrial scale, including carbon dioxide ($CO_2$) capture from flue gas, natural gas purification, and air separation. The alloying material used with V, Ta, or Nb can be ruthenium (Ru), iron (Fe) or molybdenum (Mo).

The use of $H_2$ as a sweep gas alongside this novel technology can have two major benefits: (1) vacuum power is replaced by fan or blower power to create a stream of $H_2$ gas that can mix with the desorbing atomic N, diluting it to a sufficient partial pressure to maintain the driving force for the N transport across the membrane; and (2) ammonia can be formed as a byproduct of the $N_2$ separation process through the reaction of hydrogen gas with atomic N. Nearly half of the hydrogen produced globally is used for ammonia synthesis, which is primarily used for agriculture, a demand that is directly proportional to world population increase. The present invention can provide a route to carry out the ammonia synthesis process at significantly lower pressures, adding huge savings to the agricultural industry. Ammonia synthesis consumes nearly half of the hydrogen produced globally and 1-2% of world's energy. Ammonia is currently produced at industrial scales and primarily used for agriculture as a fertilizer and a precursor to other nitrogen fertilizers. Fertilizers are one of the most important factors in securing sufficient global food production, and the demand is directly proportional to world population increase. If ammonia synthesis using the nitrogen-selective membrane proves to be less energy-intensive and costly than the traditional high-pressure Haber-Bosch process, large savings in energy use and costs can be expected due to the large scale of the fertilizer industry. Onsite ammonia production can also be possible due to the compactness of the membrane-based production unit, thus saving the costs of transporting the fertilizers.

Additional benefits can be attained if chemically-resistant nitrogen-selective membranes are applied to post combustion $CO_2$ separation, for example before the selective catalytic reducer. The separation of $N_2$ in the flue gas will reduce the total volume of the flue gas, thus lowering the energy use for gas handling in the subsequent pollutant removal processes.

An aspect of the invention is a method of producing a nitrogen-hydrogen compound. The method includes providing a nitrogen gas stream to a first side of a metallic membrane. The metallic membrane is an alloy comprising a Group V element. Nitrogen dissociates through the membrane into atomic nitrogen. The nitrogen reacts with a hydrogen gas on a second side of the metallic membrane and forms at least one nitrogen-hydrogen compound. The nitrogen-hydrogen compound is selected from the group consisting of NH, $NH_2$, $NH_3$, and combinations thereof. The nitrogen-hydrogen compound desorbs from the metallic membrane.

An aspect of the invention is a method of forming a $N_2$-selective metallic membrane. The method includes applying a Group V metal and an alloying metal selected from the group consisting of molybdenum, iron and ruthenium to the substrate. The alloy membrane is formed on the substrate by interconnecting the Group V metal and the alloying metal.

An aspect of the invention is a $N_2$-selective metallic membrane. The membrane includes an alloy comprising a Group V metal, and a second metal selected from the group consisting of molybdenum, ruthenium, iron, and combinations thereof. The alloy is interconnected to at least a portion of a surface of the substrate.

DETAILED DESCRIPTION

The present invention relates to a method to produce a nitrogen selective membrane, the membrane and methods of using the membrane.

An aspect of the invention is a method to produce a nitrogen-hydrogen compound. The method includes providing a metallic membrane that includes a Group V element as an alloy. Nitrogen gas is provided to a first side of the metallic membrane. The nitrogen gas disassociates through the metallic membrane into atomic nitrogen (N). Hydrogen gas is provided to the second side of the membrane and reacts with the atomic nitrogen to produce the nitrogen-hydrogen compound. The nitrogen-hydrogen compound can be NH, $NH_2$, $NH_3$, and combinations thereof. The nitrogen hydrogen compound can desorb from the metallic membrane.

In some embodiments, the nitrogen-hydrogen compound can be further reacted with hydrogen, for example if the nitrogen-hydrogen compound is NH or $NH_2$, to form ammonium.

The nitrogen can be in a gas stream generated from a coal fired power plant. Other sources for the nitrogen gas can include natural gas power plants. The gas stream can contain other gases, for example carbon dioxide, sulfur dioxide, nitrogen dioxide, nitrogen oxide, water, oxygen or hydrocarbon compounds, like methane, ethane, butane and combinations thereof. The membrane selectively disassociates the nitrogen gas and does not react with other gases in the gas stream.

In some embodiments, a purging gas can be provided to the membrane to reduce or prevent oxides from forming on the membrane. The purging gas can be provided before the start of a process, or intermittently during the process at a time interval of between about 1 hour to about 3 hours. The purging gas can be hydrogen gas, nitrogen gas, argon, sulfur dioxide, nitrogen oxide or nitrogen dioxide, or combinations thereof.

The method to produce the nitrogen-hydrogen compound can occur at a temperature between about 200° C. and about 1000° C. In some embodiments, the operating temperature can be between about 400° C. and about 600° C. The temperature of the system can be ramped to the operating temperature at a ramp rate of between about 1° C./min and about 5° C./min. The operating pressure of system can be between about atmospheric pressure (about 14 psi) and about 840 psi. One skilled in the art would understand that atmospheric pressure can be different at sea level compared to at altitude. The present invention would be suitable at the atmospheric pressure regardless of the location of the process.

The alloy in the membrane includes a Group V element and at least one additional material. The Group V element can be V, Ta, or Nb. The alloying element can be iron, ruthenium, or molybdenum, or combinations thereof.

Figure 1:
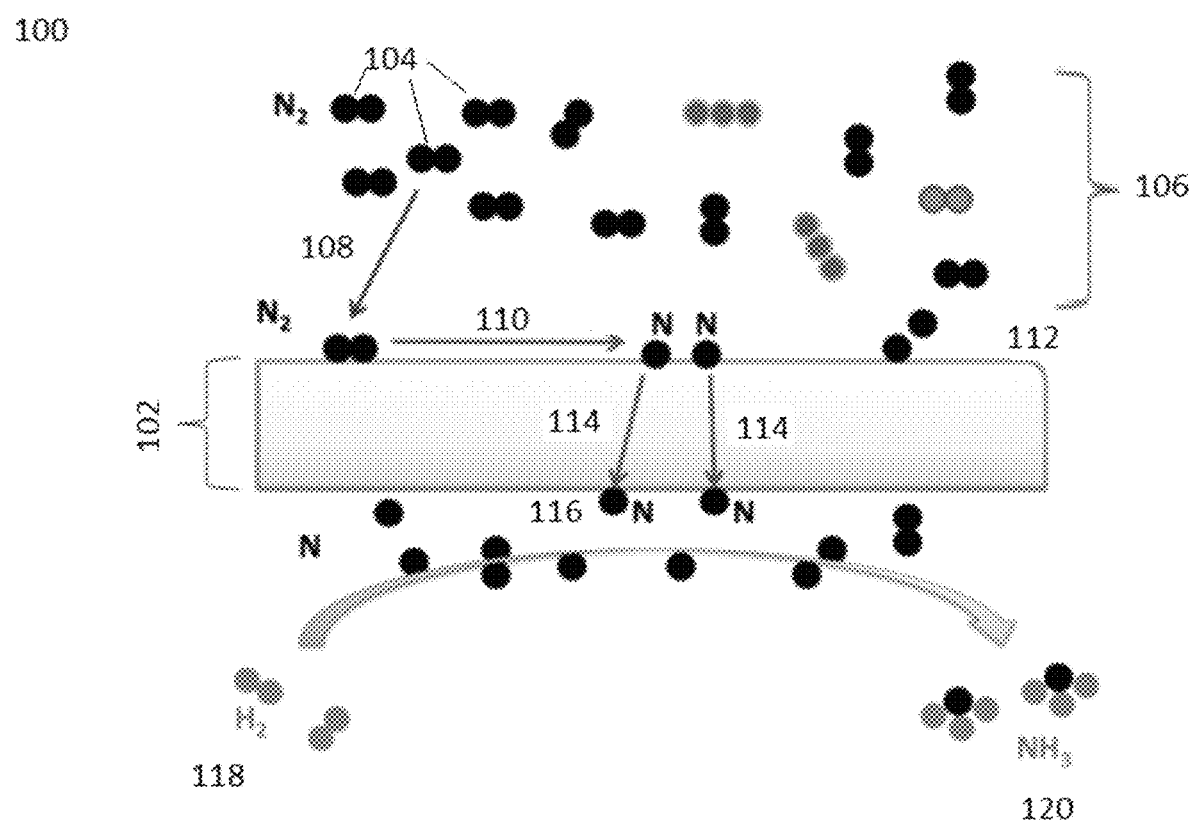
FIG. 1 illustrates a general method of using a metallic membrane to separate nitrogen gas from a gas mixture based upon a solution-diffusion mechanism.

FIG. 1 illustrates a general method 100 of using a metallic membrane 102 to separate nitrogen 104 from a gas mixture 106 based upon a solution-diffusion mechanism. Nitrogen 104 first adsorbs 108 and catalytically dissociates 110 on the surface 112 of the membrane 102. Atomic N diffuses 114 through the interstitial crystal sites of the bulk metal of the membrane 102, ultimately leading to atomic N on the permeate 116 (or sweep) side of the membrane 102. The flux of nitrogen 104 across the membrane 102 is dependent upon a partial pressure driving force, which can be created by using hydrogen gas 118 as a sweep gas and by working at high pressure in the retentate side 106. The use of hydrogen gas as a sweep gas allows for the synthesis of ammonia 120.

An aspect of the invention is a method for forming a nitrogen ($N_2$)-selective metallic membrane. The method includes providing a Group V metal selected from the group consisting of V, Ta, or Nb, and an alloying material selected from the group consisting of molybdenum, iron, ruthenium, and combinations thereof. The Group V metal and the alloying material are deposited on the substrate to form the alloy.

In some embodiments, the Group V metal can be V and the alloying material can be molybdenum. The method to deposit the Group V metal or the alloying material can be sputtering. The total amount of the Group V metal in the alloy coating can be between about 6.25 at. % and about 25 at. %. The Group V metal can be deposited at a thickness of between about 0.3 microns and about 10 microns. The total amount of the alloying material can be between about 6 at. % and about 33 at. %. The metals, alloying or Group V, are greater than 99.99% pure, and therefore little if any incidental materials are present in the alloying material. The alloying material can be deposited at a thickness of between about 0.5 microns and about 3 microns. The total thickness of the Group V metal and the alloying material can be between about 0.8 microns and about 13 microns. The Group V metal and the alloying material can be deposited at a temperature between about 450° C. and about 600° C. In some embodiments, the deposition can occur in an inert environment. The inert environment can be created using an inert gas, such as argon, helium, and combinations thereof.

The substrate can be alumina, or porous stainless steel. In some embodiments, the substrate can be Hastelloy®, for example Hastelloy® X Mott. The pore size of the substrate can be less than about 0.2 microns. In some embodiments, the pore size can be between about 20 microns and about 40 microns. The thickness of the substrate can be between about 2000 microns and about 5000 microns to resist at mechanical stress. The total thickness of the coated membrane can be between about 2000 microns and about 5045 microns. In some embodiments, the membranes can be unsupported by a substrate. If the membrane is unsupported, then the thickness of the membrane can be between about 0.8 microns and about 45 microns.

An intermediate layer can be present between the substrate and the alloy coating. The intermediate layer can include a porous material. The intermediate layer can be zirconium oxide, or alumina. In some embodiments, the intermediate layer can be the substrate. The intermediate layer can be between about 2 microns and about 35 microns. The intermediate layer can be formed by depositing the intermediate layer material onto the substrate. In some embodiments, the intermediate layer material can be deposited by sol-gel, or impregnation. The thickness of a supported membrane including an intermediate layer can be between about 2000 microns and about 5100 microns.

The alloy coating can be annealed. The annealing temperature can be between about 400° C. and about 500° C. The annealing time can be between about 30 minutes and about 300 minutes. The annealing pressure can be atmospheric pressure. Annealing can create a crystalline bulk-phase alloy.

The substrate can be treated to decrease the thickness of the coated membrane. In some embodiments, the surface of the substrate can be smoothened to decrease the thickness of the coated membrane by sand blasting, scratching, sanding, or other method. The surface of the substrate can be cleaned with distilled water, followed by rinses with a polar and non-polar solvent. The substrate can be dried at room temperature, at a temperature between about 25° C. and about 100° C. Following the surface treatment, the substrate can be coated.

An aspect of the invention is a method of forming a $N_2$-selective metallic membrane. The method includes providing a Group V metal and an alloying material. The Group V metal and the alloying material are combined to form an alloy. The alloy is hot rolled to form membrane foils. The membrane foils are unsupported.

The alloy in the membrane includes a Group V element and at least one additional material. The Group V element can be V, Ta, or Nb. The alloying element can be iron, ruthenium, or molybdenum, or combinations thereof. In some embodiments, the Group V metal can be V and the alloying material can be iron. The method to deposit the Group V metal or the alloying material can be hot rolled. The total amount of the Group V metal in the alloy coating can be between about 6.25 at. % and about 25 at. %. The total amount of the alloying material can be between about 10 at. % and about 90 at. % The Group V metal and the alloying material are annealed in the ovens during rolling. The total thickness of the Group V metal and the alloying material can be between about 10 microns and about 200 microns. In some embodiments, the hot rolling can occur in an inert environment. The inert environment can be created using an inert gas, such as argon, helium, and combinations thereof.

An aspect of the invention is a nitrogen selective metallic membrane. The membrane includes an alloy of a Group V metal and a second metal selected from the group consisting of molybdenum, ruthenium, niobium, and combinations thereof. The membrane can be unsupported.

Figure 2:
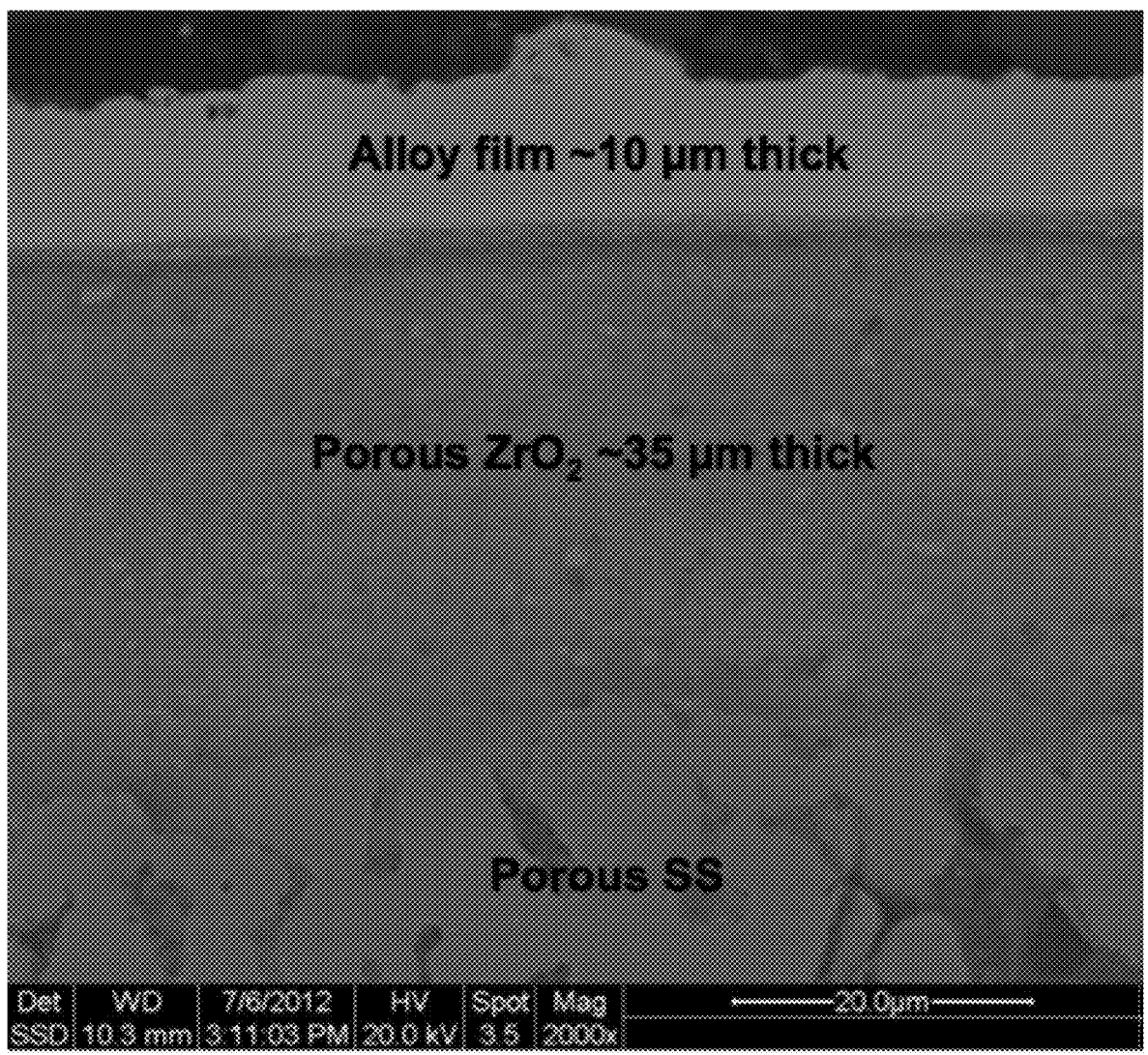
FIG. 2 illustrates a cross section of the membrane illustrating the deposition layers on a porous support, illustrated as a stainless-steel material.

FIG. 2 illustrates a cross section of the membrane illustrating the deposition layers on a porous support, illustrated as a stainless-steel material. The membrane includes an intermediate layer, illustrated in FIG. 2 as being porous $ZrO_2$. The alloy coating or film can include V—Ru, Nb—Ru, Ta—Ru, V—Mo, Nb—Mo, Ta—Mo, V—Fe, Nb—Fe, or Ta—Fe.

An aspect of the invention is a method to use a membrane for nitrogen separation. The method can be used in a process selected from the group consisting of an air separation process, post combustion $CO_2$ separation, formation of ammonia, natural gas clean-up, and combinations thereof.

An advantage of the present invention is a reduction of cost associated with nitrogen separation, $CO_2$ capture technology, and formation of nitrogen-hydrogen compounds. The process can be operated at low pressure (down to about 10 bar), which allows for a reduction in costs associated with the process, especially in comparison to the traditional Haber-Bosch process.

The membranes of present invention can result in the following particular properties. Membrane samples were tested between about 200° C. to about 1000° C. at partial pressure gradients ranging between about 90 psig and about 840 psig. At each of the temperatures considered, the V membranes exhibited a continuous increase in the $N_2$ permeability with an increase in temperature. The $N_2$ permeabilities varied between about $2.24 \times 10^{-13}$ mol/m·s·Pa$^{1/2}$ to $3.37 \times 10^{-13}$ mol/m·s·Pa$^{1/2}$ for V membranes over the range of pressure gradients tested.

EXAMPLES

Due to the high temperatures required for N diffusion through metals, the membrane will be tested over a range of temperatures from 200° C. to 1000° C. The Hastelloy X alloy was selected as the material of construction for the module because of its durability at elevated temperatures, showing high performance up to temperatures of 1177° C. The membrane module is leak-tight from application of custom-manufactured Hastelloy X bolts, nuts, and washers. The sample membrane foil and intermetallic diffusion barrier (e.g., alumina paper type APA-3, Zircar Ceramics) is housed onto the Hastelloy X porous support (custom made 0.75 inch OD, 0.125 inch thick, media grade 100, Mott Corporation) within the module, and graphite gaskets are used to seal the membrane.

Permeation Tests

Permeation tests were carried out using two different analysis instruments, i.e., a simple custom-built soap bubble flow meter and a commercial Extrel electron ionization quadrupole mass spectrometer (EIQMS) with concentration sensitivity down to the low ppm range. In the gas permeation experiments, the first step was to measure the flux of an inert gas (argon or helium) through the membrane at the desired temperature and the pressure gradient to identify any leaks in the membrane resulting from tiny pinholes or leaks around the graphite seal. Even though the cold-rolled V and Nb foils were designated "light tight" by the manufacturer, they can still contain small pinholes that are not visible to the naked eye through which gases can diffuse by the Knudsen mechanism, where the pore size is of the same length scale as the mean-free-path of the penetrant atom or molecule. The $N_2$ flux through the surface defects were then calculated from the inert gas permeation measurements using the Knudsen diffusion equation as given in Equation (1).

$$\frac{D_A}{D_B} = \sqrt{\frac{MW_B}{MW_A}} \qquad (1)$$

D is the diffusion coefficient and MW is the molecular weight of a given diffusing species. Application of Eq. (1) to the inert gas flux data provides information on the contribution to the overall $N_2$ flux resulting from potential leaks through possible defects. The difference between the overall $N_2$ flux data obtained from the $N_2$ permeation experiments and the Knudsen normalized $N_2$ flux data obtained from the inert gas permeation experiments results in the actual $N_2$ flux obtained from the permeation through the bulk metal via the solution-diffusion mechanism as demonstrated quantitatively in Eq. (2):

$$N_{N_2}(\text{Solution-Diffusion}) = N_{N_2}(N_{N_2} \text{ permeation test}) - N_{N_2}^{Knudsen}(\text{Inert gas permeation test}) \qquad (2)$$

During the permeation experiments, the pressure on the feed side of the membrane was varied between about 60 and 198.6 psig using Tescom back-pressure regulators and both inert feed gas and $N_2$ flows are controlled by Aalborg mass flow controllers. The feed gas that permeates through the membrane proceeds to the permeate side and is swept by argon whose flow rate is also controlled using an Aalborg mass flow controller. The feed and sweep gas flow rates were maintained in the range of 100-120 sccm and the gas that cannot pass through the membrane is vented through the retentate line. By establishing calibration curves that relate the intensity (from the EI-QMS detector) to the concentration, the permeate $N_2$ (or ammonia) concentration may be directly measured.

$N_2$ Flux Measurements

Figure 3A:
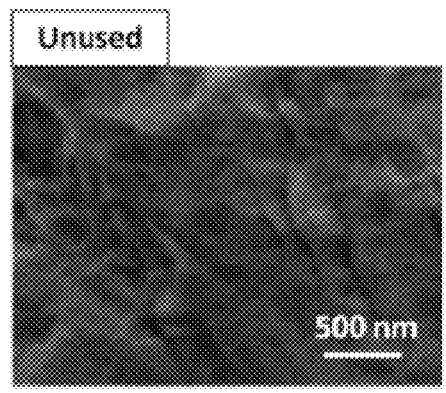
FIG. 3A illustrates an unused membrane.
Figure 3B:
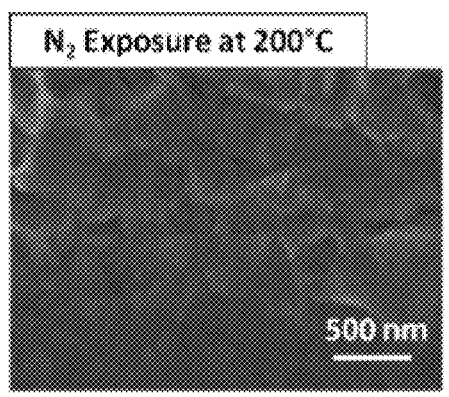
FIG. 3B illustrates the membrane after nitrogen gas exposure at 200° C.
Figure 3C:
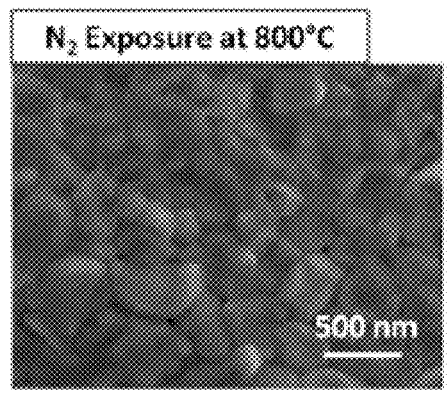
FIG. 3C illustrates the membrane after nitrogen gas exposure at 800° C.
Figure 3D:
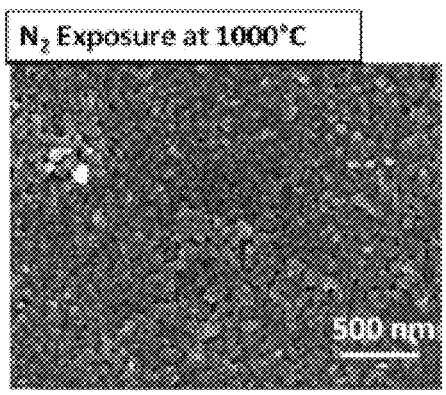
FIG. 3D illustrates the membrane after nitrogen gas exposure at 1000° C.

Initial tests were performed to investigate the $N_2$ permeability across pure V membrane foil as a function of temperature and partial pressure driving force. The membranes were characterized before and after each flux experiment. Membrane samples were tested after exposure to the nitrogen gas at 200° C., 800° C., and 1000° C. A variety of characterization techniques were carried out. High-resolution Scanning Electron Microscopy (SEM) was conducted on a pure V membrane for surface morphology and are illustrated in FIGS. 3A-D. FIG. 3A illustrates an unused membrane. FIG. 3B illustrates the membrane after nitrogen gas exposure at 200° C. FIG. 3C illustrates the membrane after nitrogen gas exposure at 800° C. FIG. 3D illustrates the membrane after nitrogen gas exposure at 1000° C. The V membranes exhibited a continuous increase in the $N_2$ permeability with an increase in temperature. The $N_2$ permeabilities varied between about $2.24 \times 10^{-13}$ mol/m·s·Pa$^{1/2}$ to $3.37 \times 10^{-13}$ mol/m·s·Pa$^{1/2}$ for V membranes over the range of pressure gradients tested (about 90 psig to about 198.2 psig). The $N_2$ permeability in V is found to be five orders of magnitude smaller compared to that of the target case of $H_2$ in Pd36 (~$4 \times 10^{-8}$ mol/m·s·Pa$^{1/2}$). The low flux observed for the pure V membranes can be explained readily based upon the results of the electronic structure calculations previously discussed. Nitrogen binding within the crystal structure of V is too strong, but can be weakened by alloying these metals with an alloying material like Ru, thereby enhancing the permeability by adjusting the solubility and diffusivity of atomic N within the crystal lattice.

Figure 4:
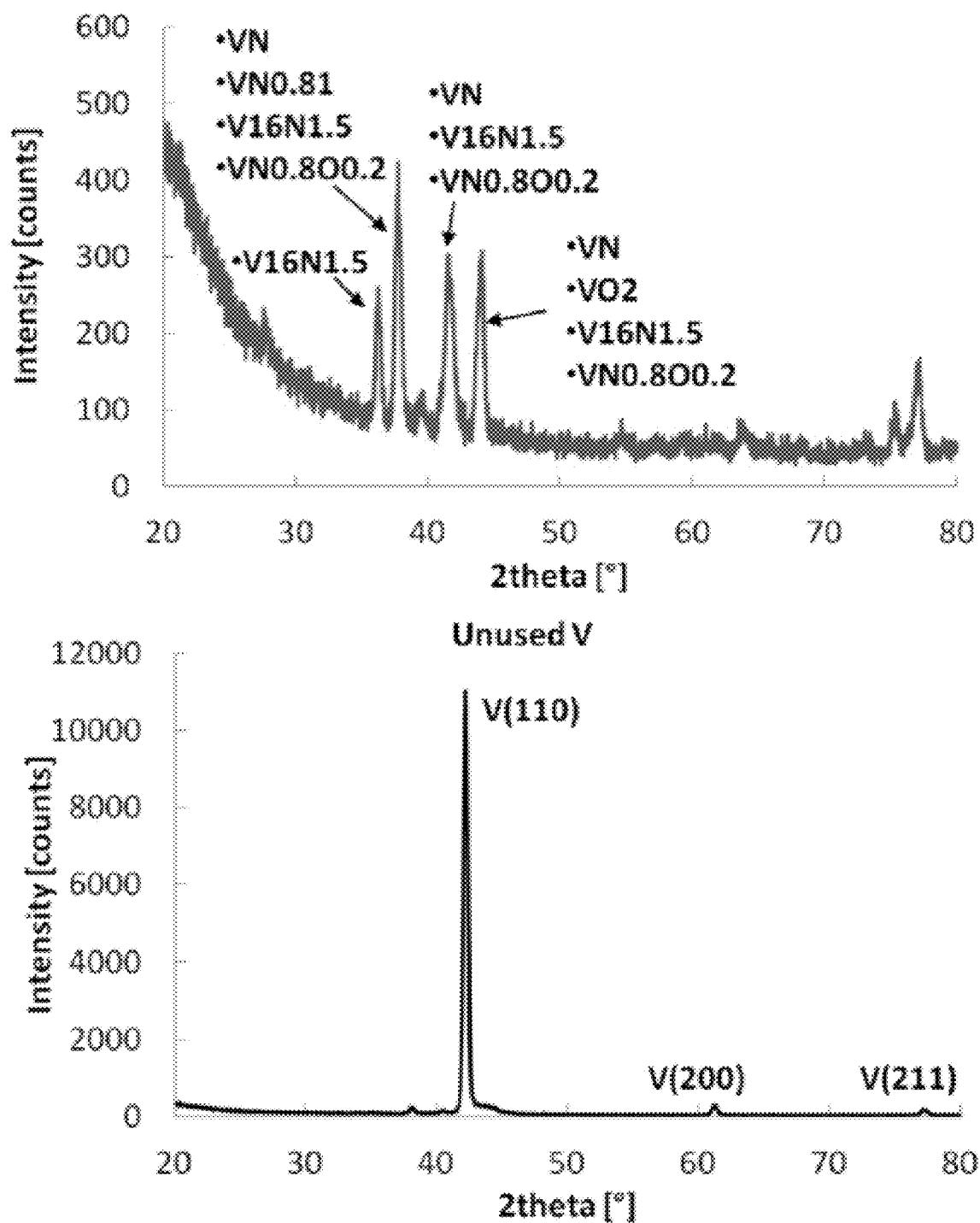
FIG. 4 illustrates XRD on membranes.

Various characterization experiments have been performed on the feed side of the pure V metallic membrane that were used for $N_2$ permeation experiments. In addition to the SEM imaging illustrated in FIGS. 3A-D, characterization was performed using XRD and is illustrated in FIG. 4. The XRD characterization indicated that after $N_2$ permeation at high temperature (1000° C.), the pure V developed surface nitrides and to some extent oxide species. Although the formation of oxides is not necessarily favorable, since if they penetrate deep enough into the bulk they can influence $N_2$ dissociation and the subsequent transport rate through the membrane, these results validate the solution-diffusion mechanism of nitrogen permeation through these dense catalytic metallic membranes. Provided that the oxide only forms at the surface, this may in fact benefit the transport of N as it can aid in preserving the structured nature of the bulk phase, preventing the formation of defects and or grain migration at high temperature.

Figure 5:
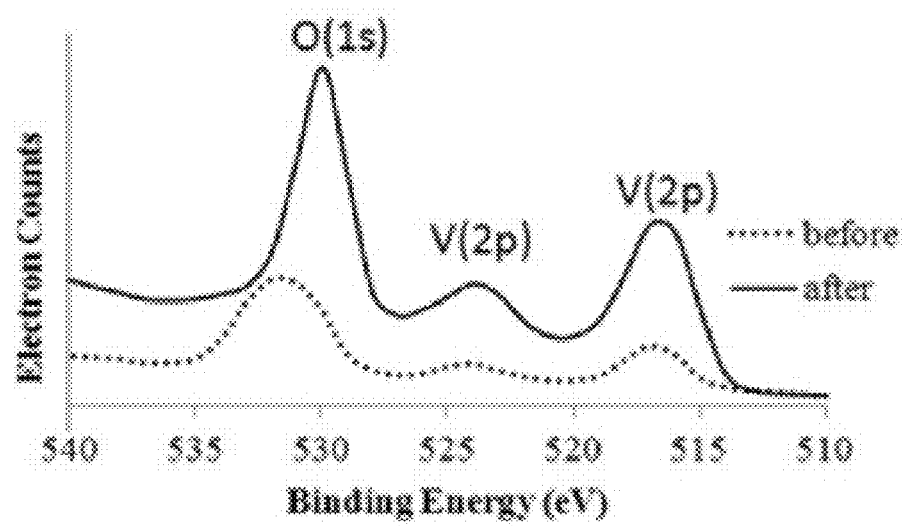
FIG. 5 illustrates X-ray Photoelectron Spectroscopy (XPS) performed for the quantitative compositional analysis and for information on oxidation state of the metals.

FIG. 5 illustrates X-ray Photoelectron Spectroscopy (XPS) performed for the quantitative compositional analysis and for information on oxidation state of the metals. XPS can reveal any surface segregation of V compared to the bulk composition because it looks at only the first few atomic layers.

Additional tests were performed to investigate the $N_2$ permeability across pure V, Ta and Nb membrane foils as a function of temperature and partial pressure. Membrane samples were tested between about 400° C. and 600° C. at partial pressure gradients ranging between about 3.0 and 6.0 bar. At all of the temperatures considered, the V membranes exhibited a continuous increase in the $N_2$ permeability with an increase in temperature. The $N_2$ permeabilities varied between $1.14 \times 10^{-12}$ mol/m·s·Pa$^{1/2}$ to $3.18 \times 10^{-13}$ mol/m·s·Pa$^{1/2}$ for V membranes over the range of temperature tested. It is important to note that these values are 4-5 orders of magnitude smaller compared to that of the target case of $H_2$ in Pd42 (~$4 \times 10^{-8}$ mol/m·s·Pa$^{1/2}$).

It was shown that V, Nb, and Ta had infinite selectivity to nitrogen over $CO_2$ with an exponent value of 0.5 for the pressure dependence, which implies that a solution diffusion mechanism takes place with nitrogen permeation.

Table 1 provides the measured nitrogen permeating flux through the membranes at different Δp and 400° C. The units are L/m$^2$·day. All values in Table 1 are approximate. Vanadium shows the highest permeating flux, followed by Nb and Ta at 400° C.

TABLE 1

| Δp [bar] | Nb | Ta | V |
|---|---|---|---|
| 2 | 34 | 28 | 40 |
| 3 | 45 | 40 | 57 |
| 4 | 62 | 45 | 62 |
| 5 | 68 | 57 | 73 |

The low flux observed for pure V membranes can be explained readily based upon the results of the electronic structure calculations. Nitrogen binding within the crystal structure of V is too strong, but can be weakened by alloying these metals with alloying materials like Mo, Nb and Fe, thereby enhancing the permeability by adjusting the solubility and diffusivity of atomic N within the crystal lattice.

High-pressure experiments have also been conducted. More specifically, the permeation measurements were performed at about 400° C., followed by about 500° C. and about 600° C., continuously. A backpressure regulator rated for high pressure was used, enabling the permeation tests at about 30, 40, 50, and 60 bar of Δp at each temperature tested. Disc foils of V, Ta and Fe with a diameter of 25.4 mm (Goodfellow Inc.) were used for the permeation experiments. Table 2 provides the measured nitrogen permeating flux through the membranes at different Δp and temperature conditions. The units are L/m$^2$·day. All values in Table 2 are approximate. Vanadium shows the highest permeating flux, followed by Ta and Fe at 400° C. The Ta results are reported only for 400° C. since it became brittle at 500° C. with the formation of cracks in the membrane foil.

TABLE 2

| p [bar] | V | | | Fe | | | Ta |
|---|---|---|---|---|---|---|---|
| | 400° C. | 500° C. | 600° C. | 400° C. | 500° C. | 600° C. | 400° C. |
| 30 | 116 | 239 | 402 | 88 | 158 | 15 | 99 |
| 40 | 156 | 352 | 603 | 125 | 225 | 26 | 133 |
| 50 | 216 | 465 | 828 | 165 | 311 | 33 | 178 |
| 60 | 271 | 577 | 1079 | 211 | 376 | 45 | 223 |

Figure 6A:
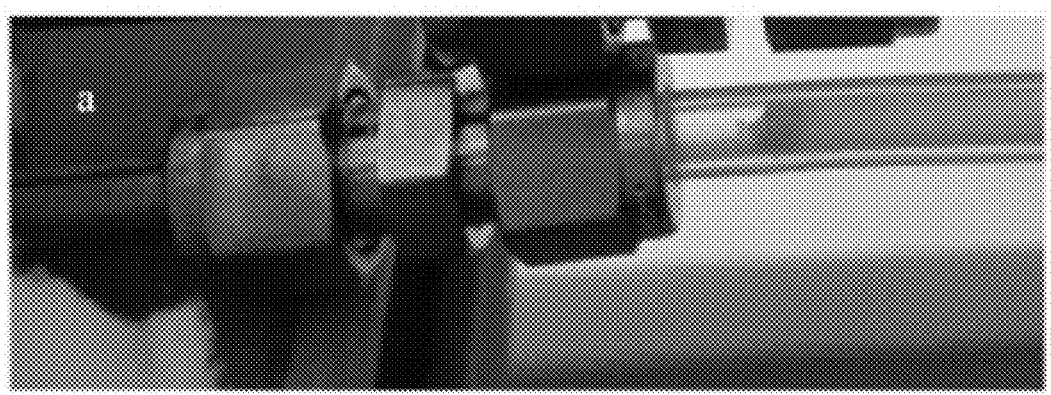
FIG. 6A illustrates the permeate outlet after approximately 5 minutes.
Figure 6B:
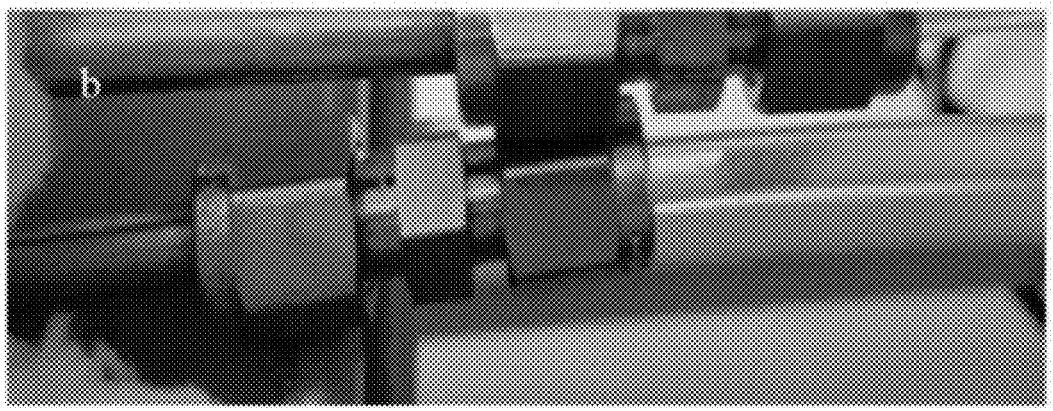
FIG. 6B illustrates the permeate outlet after approximately 16 min from the start of the test.

After the permeation measurements, a preliminary and qualitative test for ammonia synthesis at low pressure was performed at about 500° C. and a Δp of about 60 bar using a V foil. Pure $N_2$ was fed into the retentate side and $H_2$ was used as a sweep gas. A Drager tube was placed in the permeate stream to detect the presence of $NH_3$ on the order of ppm concentrations. The material consisted of reagent and a pH indicator, which changed color from yellow to blue in presence of $NH_3$. FIGS. 6A and 6B illustrate the permeate outlet where the $NH_3$ Drager tube was used to detect $NH_3$ in the permeate stream. The ammonia production is indicative from the yellow-to-blue color change in the tube as shown. FIG. 6A illustrates the permeate outlet after approximately 5 minutes. FIG. 6B illustrates the permeate outlet after approximately 16 min from the start of the test. FIGS. 6A and 6B illustrate the production of $NH_3$ through the use of a nitrogen permeating membrane reactor technology at low pressure.

Figure 7A:
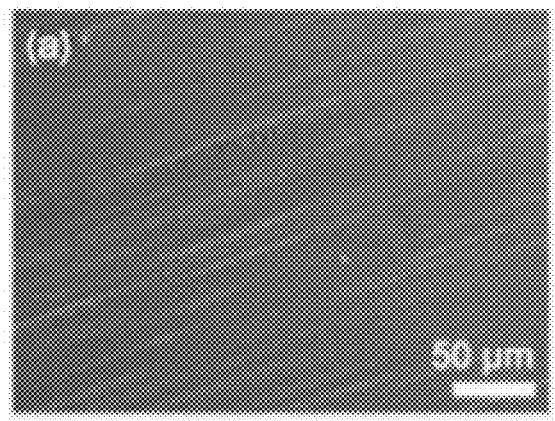
FIG. 7A illustrates the as-rolled V surface.
Figure 7B:
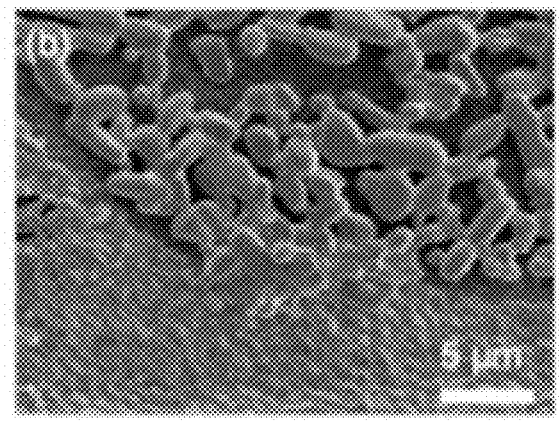
FIG. 7B illustrates the V surface after permeation with many grain structures of various sizes appearing on the surface.
Figure 7C:
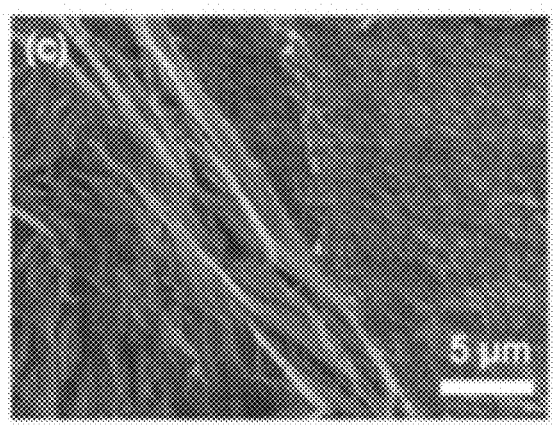
FIG. 7C illustrates a tilted cross-section of the tested V membrane.
Figure 8:
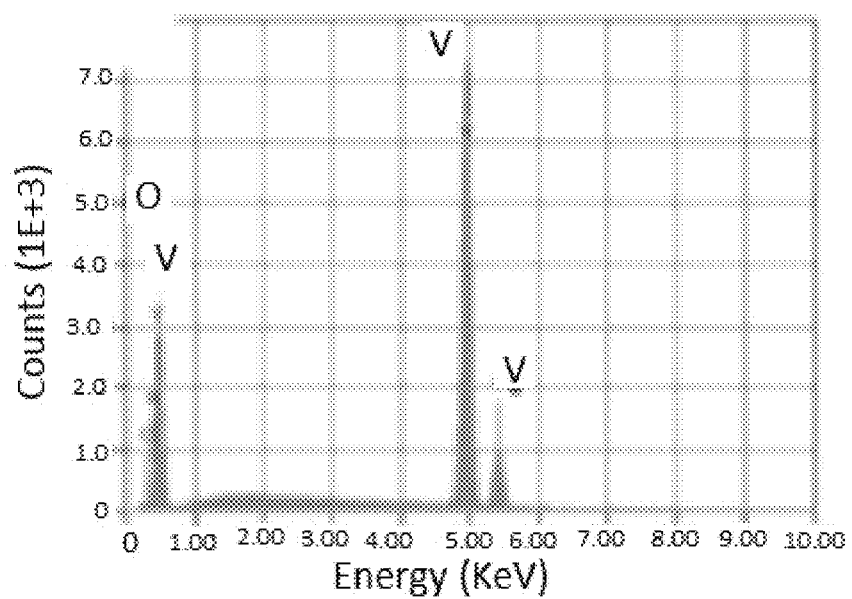
FIG. 8 illustrates EDS analysis on the tested V membrane.

Various characterization experiments have been performed on the feed side of pure V, Ta, Fe, and Nb metallic membranes that were used for $N_2$ permeation experiments. FIGS. 7A-C illustrate the SEM analysis performed on the V membrane in particular. FIG. 7A illustrates the as-rolled V surface. FIG. 7B illustrates the V surface after permeation with many grain structures of various sizes appearing on the surface, which may be associated with the formation of V oxides. Since grain growth seemed more significant at the center of the membrane than at the outer part of the membrane, the source of oxygen may be in the feed gas. FIG. 7C illustrates a tilted cross-section of the tested V membrane. Energy-dispersive spectroscopy (EDS) illustrated in FIG. 8 illustrates a clear oxygen peak along with the V peaks further indicating the presence of oxide formation. In the tilted cross-section (FIG. 7C), it is noticeable that the grain structures are present only at the surface, while the bulk structure appears to remain more metallic, implying that nitrogen diffusion may take place in part through the bulk metal grain boundaries rather than the oxide grain boundaries. Diffusion through the metal grain boundaries is reasonable since the formed oxide looked porous, implying that the infinite selectivity of nitrogen would not be guaranteed if the entire membrane had become oxidized. Provided that the oxide only forms at the surface, this can benefit the transport of N as it can aid in preserving the structured nature of the bulk phase, thereby preventing the formation of defects and or grain migration at high temperature.

Ranges have been discussed and used within the forgoing description. One skilled in the art would understand that any sub-range within the stated range would be suitable, as would any number within the broad range, without deviating from the invention.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiment described hereinabove is further intended to explain the best mode known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

What is claimed is:

1. A method of producing a nitrogen-hydrogen compound, comprising:
   providing a metallic membrane, wherein the metallic membrane is an alloy comprising a Group V element;
   providing a nitrogen ($N_2$) stream to a first side of the metallic membrane;
   dissociating the $N_2$ into atomic nitrogen (N) with the metallic membrane;
   reacting the dissociated nitrogen with a hydrogen gas on a second side of the metallic membrane;
   forming at least one nitrogen-hydrogen compound, wherein the nitrogen-hydrogen compound is selected from the group consisting of NH, $NH_2$, $NH_3$, and combinations thereof;
   desorbing the nitrogen-hydrogen compound from the metallic membrane; and
   reacting the nitrogen-hydrogen compound with hydrogen to form an ammonium cation at a temperature between about 200° C. and about 1000° C.

2. The method of claim 1, wherein the nitrogen stream is produced in a coal fired power plant.

3. The method of claim 1, wherein the metallic membrane does not dissociate or adsorb at least one of a sulfur dioxide, a nitrogen dioxide, a nitrogen oxide, a carbon dioxide, or a hydrocarbon compound.

4. The method of claim 3, wherein the hydrocarbon compound is methane.

5. The method of claim 1, wherein the metallic membrane selectively dissociates nitrogen.

6. The method of claim 1, wherein a source of the nitrogen is a flue gas.

7. The method of claim 1, further comprising providing a purging gas to the metallic membrane, wherein the purging gas is selected from the group consisting of a hydrogen gas, a nitrogen gas, an argon gas, a sulfur dioxide, a nitrogen oxide, a nitrogen dioxide, and combinations thereof.

8. The method of claim 7, wherein the purging gas is provided to the metallic membrane between about 1 and about 4 hours.

9. The method of claim 1, wherein an operating temperature is less than 400° C.

10. The method of claim 1, wherein the Group V element is selected from the group consisting of V, Ta, and Nb.

11. The method of claim 1, wherein the alloy further comprises an alloying element selected from the group consisting of molybdenum, iron, and ruthenium.

12. The method of claim 1, wherein the nitrogen stream is from a natural gas power plant.

13. The method of claim 1, wherein the temperature is between about 400° C. and about 600° C.

14. The method of claim 1, further comprising ramping a temperature of the metallic membrane from an initial temperature to an operating temperature of between 200° C. and about 1000° C., at a ramp rate of between about 1° C./minute and about 5° C./minute.

15. The method of claim 1, wherein an operating pressure of the system is between about 14 psi and about 840 psi.

16. The method of claim 1, further comprising diffusing the atomic nitrogen through interstitial crystal sites of a bulk metal of the metallic membrane.

17. The method of claim 1, wherein the hydrogen is a sweeping gas comprising a hydrogen gas.

* * * * *

UNITED STATES PATENT AND TRADEMARK OFFICE
CERTIFICATE OF CORRECTION

PATENT NO. : 10,556,803 B2  
APPLICATION NO. : 15/707007  
DATED : February 11, 2020  
INVENTOR(S) : Jennifer Wilcox and Simona Liguori Page 1 of 1

It is certified that error appears in the above-identified patent and that said Letters Patent is hereby corrected as shown below:

In the Specification

In Column 1, Lines 15-19, please delete "This invention was made with government support under grant number 1263991 awarded by the National Science Foundation (NSF), and grant number FA9550-16-1-0357 awarded by the Army Research Office. The government has certain rights in the invention."

And insert:
--This invention was made with government support under grant number 1263991 awarded by the National Science Foundation (NSF), and grant number CBET1650259 awarded by the Army Research Office. The government has certain rights in the invention.--

Signed and Sealed this  
Twenty-second Day of November, 2022

Katherine Kelly Vidal  
*Director of the United States Patent and Trademark Office*